United States Patent [19]

Grant

[11] Patent Number: 5,339,097
[45] Date of Patent: Aug. 16, 1994

[54] COMPUTER KEYBOARD

[76] Inventor: Alan H. Grant, 3208 Woodhollow Dr., Chevy Chase, Md. 20815

[21] Appl. No.: 846,710

[22] Filed: Mar. 6, 1992

Related U.S. Application Data

[63] Continuation-in-part of Ser. No. 328,234, Mar. 24, 1989, Pat. No. 5,119,078, which is a continuation-in-part of Ser. No. 33,039, Mar. 31, 1987, abandoned, which is a continuation-in-part of Ser. No. 921,616, Oct. 21, 1986, abandoned.

[51] Int. Cl.5 .............................................. G09G 3/02
[52] U.S. Cl. .................................... 345/168; 345/157; 400/489
[58] Field of Search .............. 340/706, 710, 711, 709; 341/20, 21, 23, 22; 248/917, 918, 920, 922; 400/486, 487, 488, 489, 472, 91, 92, 195; 235/144, 146; 364/709.14, 709.15; 345/156, 157, 167, 168; D14/100, 101, 115

[56] References Cited

U.S. PATENT DOCUMENTS

| | | |
|---|---|---|
| D. 194,211 | 12/1962 | Sanderson et al. . |
| D. 250,335 | 11/1978 | Esslinger et al. . |
| D. 268,677 | 4/1983 | Ohie et al. . |
| D. 270,347 | 8/1983 | Yomo et al. . |
| D. 316,541 | 4/1991 | Roberts . |
| D. 317,595 | 6/1991 | Yoshitake . |
| D. 318,287 | 7/1991 | Tsukamoto . |
| D. 323,817 | 2/1992 | Büchin . |
| D. 324,513 | 3/1992 | Sakaguchi et al. . |
| 340,445 | 10/1893 | Marquardt et al. ............... D14/115 |
| 1,138,474 | 5/1915 | Heidner ............................. 400/489 |
| 3,698,532 | 10/1972 | Dodds . |
| 3,720,298 | 3/1973 | Alunas et al. ..................... 400/716 |
| 3,990,565 | 11/1976 | Felton et al. . |
| 4,042,777 | 8/1977 | Bequaert et al. . |
| 4,244,659 | 1/1981 | Malt . |
| 4,294,555 | 10/1981 | Galaske et al. . |

(List continued on next page.)

FOREIGN PATENT DOCUMENTS

| | | | |
|---|---|---|---|
| 2607126 | 8/1977 | Fed. Rep. of Germany ....... 400/489 |
| 998401 | 9/1951 | France ................................ 400/716 |
| 0806469 | 2/1981 | U.S.S.R. ............................... 400/718 |
| 0332476 | 7/1930 | United Kingdom . |
| 2034043 | 5/1980 | United Kingdom . |
| 2122947 | 1/1984 | United Kingdom . |

OTHER PUBLICATIONS

What'New, "Comfy typer", Popular Science, p. 10 Sep. 1990.
IBM Technical Disclosure Bulletin, Mapping the Computer 83-Keyboard to a 62-Key Keyboard, vol. 27, No. 4B, Sep. 1984, pp. 2717-2718.

*Primary Examiner*—Richard Hjerpe
*Assistant Examiner*—Chanh Nguyen
*Attorney, Agent, or Firm*—Jacobson, Price, Holman & Stern

[57] ABSTRACT

A keyboard for a computer is used with the hands of a user disposed substantially in a prehensile position with the thumb opposed to the fingers in a grasping position. The keyboard includes a first slanting keyboard surface for locating keys to be activated by a user's left hand adjacent and sloping downwardly away from a second slanting keyboard surface for locating keys to be activated by a user's right hand. The first and second keyboard surfaces are joined at a peaked central edge forming a V-shape which slopes downwardly toward a user and laterally away from the user. Twelve numbered function keys are positioned in a circular array toward an outward end of the first keyboard surface. A keypad for locating numeric keys is positioned toward an outward end of the second keyboard surface. A cursor control unit on a front surface of the keyboard, below the space bar, is used for controlling the movement of a cursor and is operated by the thumb of the user in a direction transverse to the direction of operation of the keys. The space bar may also be operated in the transverse direction or at a selected angle. Ulnar abducted deviation and hand-pronation are reduced by using the keyboard, thus reducing the incidence of carpal tunnel syndrome.

24 Claims, 6 Drawing Sheets

U.S. PATENT DOCUMENTS

| | | |
|---|---|---|
| 4,313,122 | 1/1982 | Dupressoir et al. . |
| 4,402,624 | 9/1983 | Stahl et al. . |
| 4,421,035 | 12/1983 | Gubbe et al. . |
| 4,467,150 | 8/1984 | Leitermann et al. . |
| 4,483,634 | 11/1984 | Frey et al. . |
| 4,496,943 | 1/1985 | Greenblatt . |
| 4,504,055 | 3/1985 | Wells . |
| 4,509,873 | 4/1985 | Ryan . |
| 4,522,518 | 6/1985 | Schmidt . |
| 4,527,149 | 7/1985 | Swensen . |
| 4,560,844 | 12/1985 | Takamura et al. . |
| 4,560,845 | 12/1985 | Takamura et al. . |
| 4,562,482 | 12/1985 | Brown . |
| 4,568,056 | 2/1986 | Lewinski . |
| 4,579,470 | 4/1986 | Casey . |
| 4,597,681 | 7/1986 | Hodges . |
| 4,635,893 | 1/1987 | Nelson .................................. 400/718 |
| 4,644,875 | 2/1987 | Watt . |
| 4,658,124 | 4/1987 | Bertina . |
| 4,661,005 | 4/1987 | Lahr ................................ 340/365 R |
| 4,669,903 | 6/1987 | Herzog et al. . |
| 4,680,577 | 7/1987 | Straayer ............................. 340/711 |
| 4,693,444 | 9/1987 | Williams et al. . |
| 4,695,983 | 9/1987 | Oda et al. . |
| 4,712,101 | 12/1987 | Culver ................................ 340/710 |
| 4,724,715 | 2/1988 | Culver . |
| 4,735,394 | 4/1988 | Facco . |
| 4,735,520 | 4/1988 | Suzuki et al. . |
| 4,736,191 | 4/1988 | Matzke ............................... 340/709 |
| 4,760,217 | 7/1988 | Suzuki et al. . |
| 4,773,783 | 9/1988 | Dickie . |
| 4,775,255 | 10/1988 | Langley ................................ 400/91 |
| 4,799,049 | 1/1989 | Avila . |
| 4,803,474 | 2/1989 | Kulp .................................... 340/711 |
| 4,823,294 | 4/1989 | Rouhani . |
| 4,823,634 | 4/1989 | Culver . |
| 4,824,268 | 4/1989 | Diernisse . |
| 4,835,528 | 5/1989 | Flinchbaugh . |
| 4,851,618 | 7/1989 | Amino et al. . |
| 4,856,748 | 8/1989 | Obermeyer . |
| 4,876,415 | 10/1989 | Clancy . |
| 4,891,777 | 1/1990 | Lapeyre ......................... 364/709.15 |
| 4,896,554 | 1/1990 | Culver . |
| 4,928,093 | 5/1990 | Rahman ............................. 340/709 |
| 4,937,564 | 6/1990 | Oberg ................................. 340/710 |
| 4,974,183 | 11/1990 | Miller . |
| 4,982,618 | 1/1991 | Culver . |
| 5,021,771 | 6/1991 | Lachman . |
| 5,059,048 | 10/1991 | Sirkin . |
| 5,067,834 | 11/1991 | Szmanda et al. . |
| 5,073,050 | 12/1991 | Andrews . |
| 5,115,231 | 5/1992 | Avila et al. . |
| 5,119,078 | 6/1992 | Grant . |
| 5,122,786 | 6/1992 | Rader . |
| 5,126,723 | 6/1992 | Long et al. . |
| 5,129,747 | 7/1992 | Hutchison . |
| 5,145,270 | 9/1992 | Darden . |
| 5,156,475 | 10/1992 | Zilberman . |
| 5,160,919 | 11/1992 | Mohler et al. . |
| 5,164,712 | 11/1992 | Niitsuma . |
| 5,175,672 | 12/1992 | Conner et al. . |
| 5,212,473 | 5/1993 | Louis . |

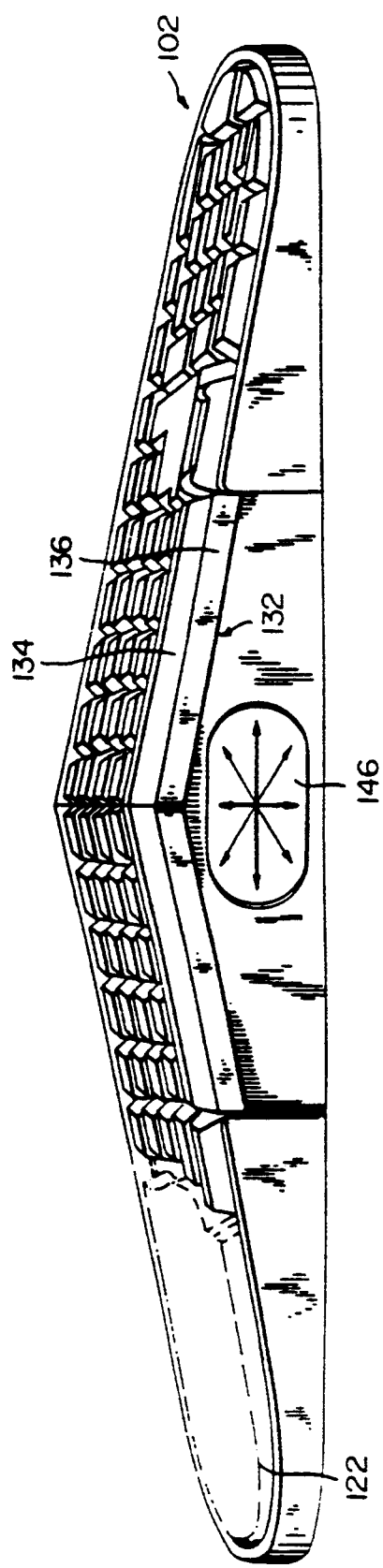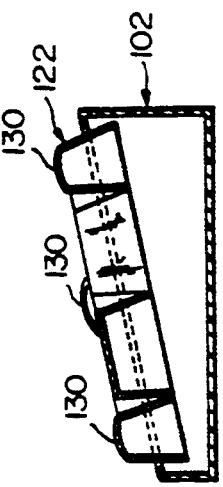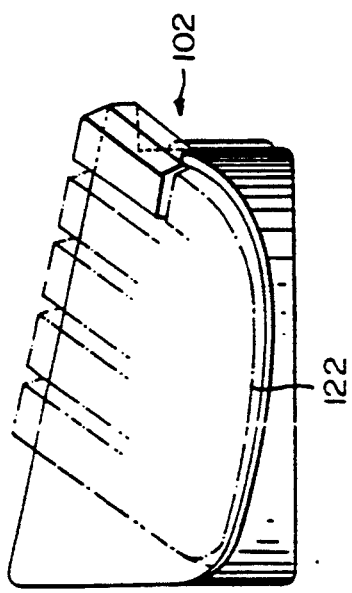

COMPUTER KEYBOARD

CROSS REFERENCE TO RELATED APPLICATIONS

This application is a continuation-in-part of pending application Ser. No. 07/328,234, filed Mar. 24, 1989, now U.S. Pat. No. 5,119,078, which is a continuation-in-part of application Ser. No. 07/33,039, filed Mar. 31, 1987 (now abandoned), which is a continuation-in-part of Ser. No. 06/921,616, filed Oct. 21, 1986 (now abandoned), the disclosures of which applications are incorporated herein by reference.

TECHNICAL FIELD

This invention relates to the art of electronic apparatus, and particularly relates to a V-shaped keyboard for a computer having first and second sides joined at a center peak and sloping downward and away from each other.

BACKGROUND OF THE INVENTION

Office equipment utilizing a video display and keyboard input is known. The widespread use of these devices has proven that, in many cases, severe physical strain results from their daily use. Many attempts have been made to reduce the strain caused by these devices by positioning the keyboard, display screen, and other associated components appropriately. None of these solutions has been completely successful.

U.S. Utility Patents U.S. Pat. No. 4,313,122 (Foster), U.S. Pat. No. 4,496,943 (Greenblatt), and U.S. Pat. No. 4,504,055 (Wells) show work stations wherein an input terminal is vertically below and horizontally in front of a video screen.

U.S. Pat. No. Design 194,211 (Sanderson), U.S. Pat. No. Design 250,335 (Esslinger), U.S. Pat. No. Design 268,677 (Ohie) and U.S. Pat. No. Design 270,347 (Yomo) show various arrangements for consoles having video displays and keyboards.

U.S. Pat. No. 4,562,482 shows an executive work station wherein an attempt has been made to accommodate the requirements of a person wearing bifocal spectacles. U.S. Pat. No. 3,990,565 (Felton) shows a typewriter having an attachment for providing a keyboard in two sections.

SUMMARY OF THE INVENTION

It is known that three ocular-neurological physiological functions are linked to form a "Near-Triad" when a subject is engaged in a task requiring the use of near vision, such as reading. These three functions are accommodation, convergence, and miosis. Accommodation is the focusing of the eye to form a clear image of the close subject, convergence is the angular relationship between the two eyes to observe that near subject, and miosis is a contraction of the pupils of the eyes.

Applicant has concluded that there are, in fact, two additional ocular-neurological physiological functions associated with a task at a close distance. These additional functions are the preferred depression of gaze and undesirable excyclotorsion which accompanies viewing targets which are both close to the observer and are placed relatively high in the visual field. The depression of gaze refers to the location of the work with respect to a horizontal line at eye level, and excyclotorsion refers to an outward rotation of the superior meridian of the eyes about their anterior-posterior geometric axes. While an individual can override the depression of gaze component and thereby focus clearly on a near object having a high placement in the visual field, this commonly produces symptoms such as eyestrain, headache, nausea, motion-sickness. Neck and shoulder discomfort also occur because the individual will posture into a capitas-extension position (head tipped backward-chin elevated) as a means of allowing an artificial (or false) depression of gaze and minimizing excyclotorsion. The five factors may be referred to as a "near quintad."

One factor producing increased tension is that the typical word processing or personal computer keyboard has approximately 85 keys (or even more), compared with no more than 60 keys for a typewriter. An operator is required to look at these keys frequently because the locations of many of the keys are not automatically known, as are the locations of the alphabet keys. Also, virtually all software programs require the use of several unfamiliar keys simultaneously, such as "Alt-F5, Shift-F10 or Control-F2." Thus, the modern keyboard must be considered to be a tool having 85 or more choices for which the operator must repeatedly view the keyboard and then the screen to select one or more keys and to verify completion of an operation.

Studies indicate that excyclotorsion, which accompanies convergence, is reduced if the direction of gaze is depressed. The greatest subjective comfort is produced when the visual target is placed in a depressed position of gaze.

The prior art has failed to adequately address these physiological factors, and no apparatus has been provided which simultaneously addresses the five functions (the "near quintad") found by Applicant to be significant.

For example, U.S. Pat. No. 4,562,482 (Brown) is concerned only with the angular extent of a bifocal segment and the optimum distance for focusing when viewing through that segment. U.S. Pat. No. 3,990,565 (Felton) teaches an apparatus which allows one to view a document being worked on at a close distance, but the work product is at a substantial distance and is angularly displaced by a large degree.

In accordance with the invention, a cabinet for a work station is provided which efficiently accounts for the five interrelated physiological factors discussed above. A video display screen is mounted in a cabinet at an angle below a horizontal line at eye level for the operator to provide depression of gaze. A document to be read by the operator is placed below the screen such that the angular excursion between the document and the video screen is within physiological comfort limits. In one embodiment, the document to be viewed is electronically projected onto the display screen so that it may be placed at almost any location.

A preferred keyboard is designed such that a user may acquire total tactile familiarity with the keyboard, thus enabling the user to copy written material and look at the screen while typing without looking at the keyboard. Operator fatigue and frequency of error are reduced even further where the keyboard is superimposed on the screen and eye movement from screen to keyboard is minimized.

The preferred keyboard of the invention is divided at its midpoint by a central peak and the outer portions slant away from the central peak and upwardly away from the user to form a shallow V-shape. The V-shaped keyboard configuration lessens ulnar abducted deviation and permits a relatively straight hand-wrist orientation. The center-peak design also lessens the amount of hand pronation, i.e. the rotation of the hands from a comfortable vertical posture into an uncomfortable horizontal posture. Further, the V-shaped arrangement enables the forearms to be separated, allowing for unobstructed visual access to a copy-viewing area placed centrally directly below the keyboard, as in the computer workstation of the invention. Strain on the hands and wrists is minimized and occupationally-induced injuries, such as carpal tunnel syndrome, are avoided.

The space bar is placed on the front edge of the keyboard and is activated by thumb pressure either vertically (conventionally), horizontally or at a selected angle. When the space bar is activated horizontally, the thumb moves in a natural grasping motion toward the forefinger.

The keyboard for the computer is used with the hands of a user disposed substantially in a prehensile position with the thumb opposed to the fingers in a grasping position. The keyboard includes a first slanting keyboard surface for locating keys to be activated by a user's left hand adjacent and sloping downwardly away from a second slanting keyboard surface for locating keys to be activated by a user's right hand. The first and second keyboard surfaces are joined at a peaked central edge forming a V-shape which slopes downwardly toward a user and laterally away from the user. Twelve numbered function keys are positioned in a circular array toward an outward end of the first keyboard surface. A keypad for locating numeric keys is positioned toward an outward end of the second keyboard surface. A cursor control unit on a front surface of the keyboard, below the space bar, is used for controlling the movement of a cursor and is operated by the thumb of the user in a direction transverse to the direction of operation of the keys. The space bar may also be operated in the transverse direction or at a selected angle. Ulnar abduction and hand-pronation are reduced by using the keyboard, thus reducing the incidence of carpal tunnel syndrome.

The keyboard may be supported on a workstation cabinet by a track which permits it to be moved along the video screen toward and away from the user. The keys preferably lie on a surface which is sloped downward toward the user by approximately 15° to 25° with respect to the horizontal.

The operator may view a work document directly, a magnified image of the document, an image of the document projected onto a screen, or an electronically generated image of the document. In one embodiment, respective removable cartridges provide for each of these alternatives.

An object of this invention is to provide a work station which is comfortable and meets physiological requirements.

A further object of this invention is to provide a work station which provides an optimum ocular-neurological function and an optimum orthopedic hand-wrist orientation.

Another object of this invention is to provide a work station wherein a display screen, keyboard, and viewing area for a work document are arranged to comply with physiological requirements.

Still another object of this invention is to provide a unique keyboard wherein keys operated by fingers are on a first surface and keys operated by a thumb are on a transverse surface.

BRIEF DESCRIPTION OF THE DRAWINGS

FIG. 8 is a front elevation view of a keyboard of FIG. 7.

FIG. 9 is a left side view of the keyboard of FIG. 7.

FIG. 10 is a section taken on line 10—10 of FIG. 7.

DETAILED DESCRIPTION OF THE INVENTION

Figure 1:
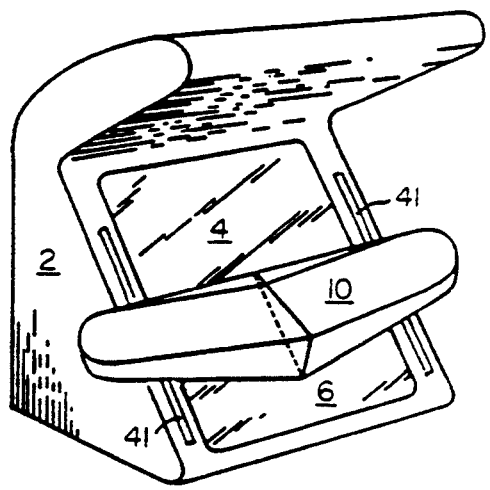
FIG. 1 is a perspective view of a preferred embodiment of a work station in accordance with the invention.

A keyboard of the invention particularly reduces the onset and severity of, or prevents entirely, the repetitive strain injury known as carpal tunnel syndrome, as well as other neurological or orthopedic malfunctions, such as tendinitis and tenosynovitis, which can also be related to usage of a flat/rectangular keyboard. These malfunctions, particularly carpal tunnel syndrome, occur when using a flat/rectangular computer keyboard which requires the hands to be fully pronated into the horizontal plane and ulnar-deviated outward at the hand-wrist junction, with a finger-flexed position. In this position, there is mechanical compression of the median nerve against the transverse carpal ligament (complicated by venous congestion) as the median nerve passes from the forearm into the hand. In this position, percussion of each key is executed in a direction which is essentially away from the action and the range of motion of the opposable thumb.

In contrast, when the hands are positioned for using a biometrically formed, center-peaked keyboard, the hands are advantageously in a prehensile orientation with the ventral surfaces of the thumb and fingers of each hand in opposed positions similar to the positions used for grasping a small object between the thumb and a finger. Prehensility, because it increases the total tactile familiarity with the keyboard, can reduce the level of visual demand to accomplish the task as well as reducing the stress on the fingers, hands and wrists.

A moderately center-peaked keyboard of the invention having keyboard halves which slope downwardly and away from each other in a V-shape (having the apex of the V toward the user) allows the hands to be positioned in the optimum prehensile position with a straight hand-wrist posture. This position is substantially stressless when compared with the hand position used for operating a conventional keyboard because it permits a relatively straight hand-wrist position and less hand pronation. Carpal tunnel syndrome and other neurological or orthopedic malfunctions are not likely to be manifested while using the keyboard described.

A keyboard of the invention may further include a cursor control unit, as discussed below, which is positioned on a surface substantially transverse to the key surface. This allows the user to actuate the cursor control unit in a natural grasp/palmar pinch motion with the hands in a prehensile position, without having to flex the fingers during use and without having to move either hand away from base position on the keyboard. The cursor control unit is operated by the user's thumbs by pressing the unit inward in a direction transverse to the direction of operation of the keys of the keyboard. Pressure on a portion of the unit causes the cursor to move on the display screen in the direction of the portion of the unit pressed. Both hands are in a prehensile position with the fingers and thumb of each hand in a grasping posture and both hands work together, reinforcing or opposing each other, when using the cursor control unit to effectuate precisely refined movement and placement of the cursor on the screen. The cursor control unit may include a concave or convex (trackball) surface which rotates around a universal joint and pressure of both thumbs, either reinforcing or opposing each other may be used.

With reference to the Figures, in which like numerals represent like elements, FIG. 1 shows a work station in accordance with the invention. A cabinet 2 includes a video display screen 4, a work document display area 6 and keyboard 10. A central processing unit (not shown) may be supported in the cabinet 2 or may be separate.

Figure 2:
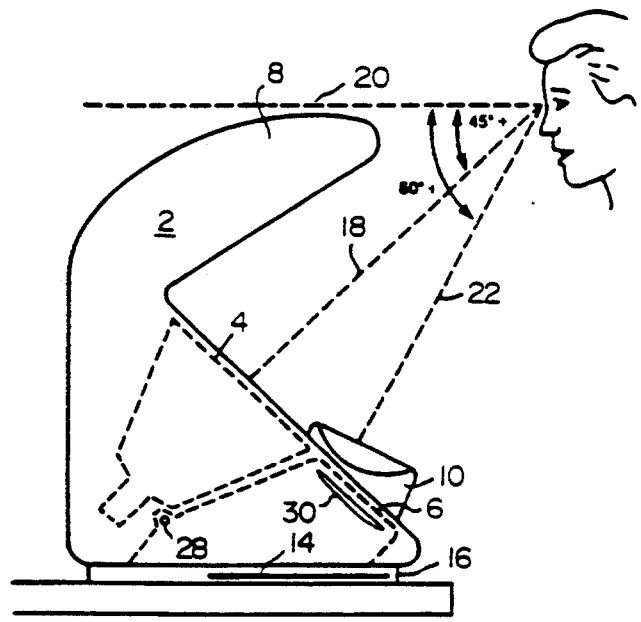
FIG. 2 is a side view of the apparatus shown in FIG. 1.

FIG. 2 is a side view of the apparatus shown in FIG. 1 and illustrates a first embodiment for allowing viewing of a work document 14. Cabinet 2 is supported by a stand 16 which provides a slot for receiving a document 14. Document 14 is placed in the slot under cabinet 2 by either sliding it in from the side, the rear, or the front, depending on the particular arrangement. Alternatively, a platen (not shown) may be used to continuously scroll a work document.

It has been discovered that the optimum arrangement for compliance with physiological demands, particularly the five interrelated factors discussed above, is to permit depression of the operator's head below a horizontal line by 15° to 20° and to provide for a depression of gaze below the angle of depression of the head by an additional 40° to 45°. Thus, the total depression below a horizontal plane would be 55° to 65°.

When an individual works at a near vision task, the head is preferably oriented downwardly with respect to a horizontal plane and the eyes are oriented further downwardly by movement with respect to the head. It is the resultant combination of head and depression of gaze which provides the most comfortable working position.

The apparatus shown in FIG. 2 provides an optimum working position by positioning the display screen 4 and keyboard 10 to reduce physiologic strain during the operation of the apparatus. Display screen 4 is placed so that line 18, connecting the eyes of the operator with a midpoint of the video display screen, is preferably approximately 45° below a horizontal line 20. In the preferred embodiment, this occurs when the operator's chin is even with the bottom of a glare-reducing hood 8. The angular extent of the display screen with respect to the operator is preferably no more than about 20°, or 10° on either side of the line 18. Keyboard 10 is located below the display screen, and line 22 connects a midpoint of the keyboard with the operator's eyes when the keyboard is at its lowermost position. Line 22 is preferably approximately 60° below the horizontal, and the keyboard has a small angular extent. The document viewing area 6 is just below keyboard 10 and requires little additional vertical angular excursion of the operator's eyes for viewing of a document.

With reference to FIGS. 2 through 6, preferred document viewing alternatives will be discussed.

FIG. 2 shows an embodiment wherein a fluorescent lamp 28 illuminates document 14. A magnified image of the document is viewed through a magnifying lens 30. This lens is preferably cylindrical, extends across the work document display area 6, and may be made of any of several materials, for example, glass or plastic. Alternatively, magnifying lens 30 is a Fresnel lens. In this embodiment, the operator will see a magnified image of document 14 in display area 6, and the document may be moved in any direction to show different sections of the document.

Figure 3:
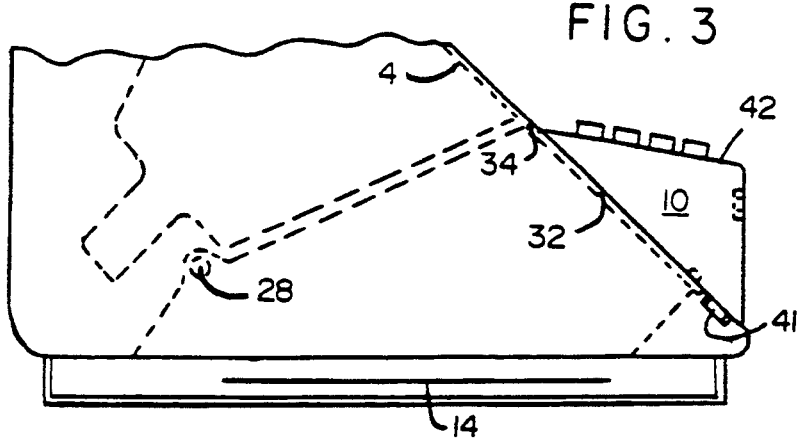
FIG. 3 is a partial side view of a second embodiment of the device shown in FIG. 1.

FIG. 3 shows a second embodiment wherein document 14 is viewed directly. Lamp 28 illuminates the area containing the document, and the document is viewed directly through a transparent door 32. The door may be hinged at 34 to permit direct access to the document through the front of the cabinet or a cartridge such as that described below. The lens 30 of FIG. 2 may be similarly hinged. The display area 6, may alternatively be open, without any transparent screen or magnifying lens.

Figure 4:
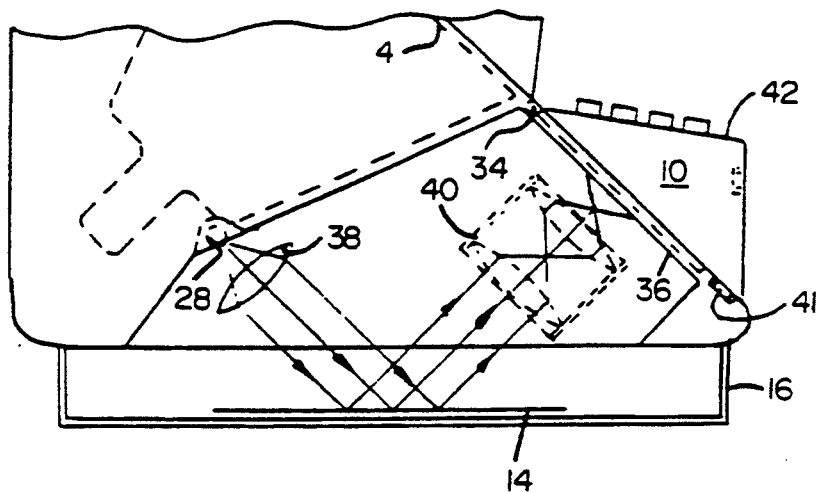
FIG. 4 is a partial side view of a third embodiment of the device shown in FIG. 1.

FIG. 4 illustrates a third embodiment wherein an image of document 14 is projected onto a screen 36. A collimating lens 38 directs light from lamp 28 onto document 14. While the light is shown confined to a somewhat narrow area, it will be appreciated that it is within the contemplation of the invention for the light from lamp 28 to extend completely across the entire work document 14. A projection lens system 40 receives the light reflected from the work document 14 and projects an erect image thereof onto screen 36 for viewing by the operator.

Figure 5:
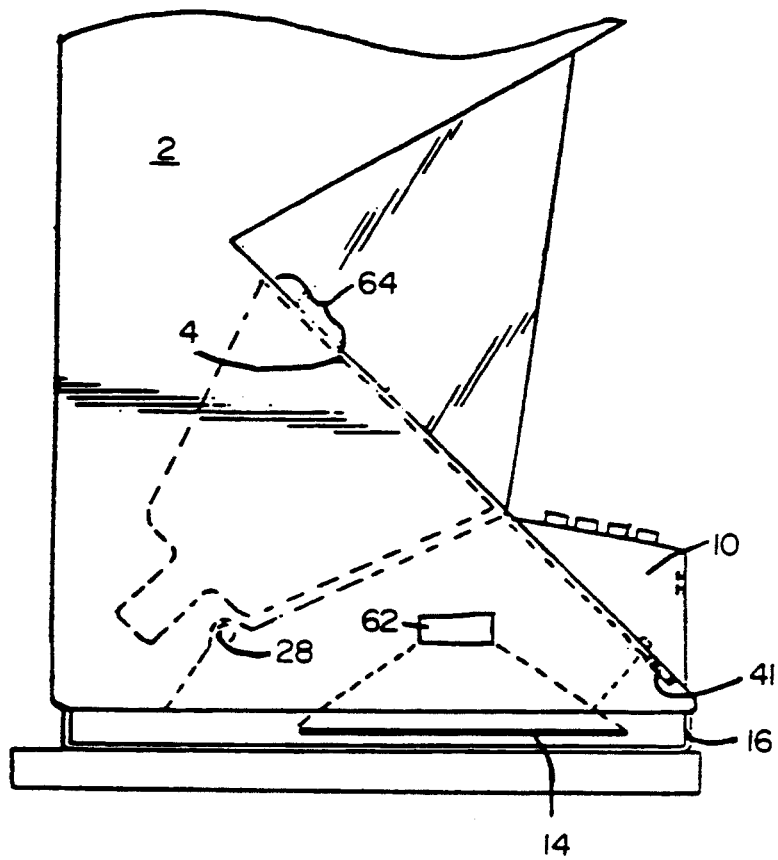
FIG. 5 is a partial view of a work station in accordance with the invention providing electronic projection of a work document.

FIG. 5 shows another alternative for viewing a document 14. An electronic imaging device 62, such as a CCD camera, scans an image of document 14 and transmits signals representative of the document image to a central processing unit, e.g. the CPU of the computer. The processing unit receives these signals and generates signals to control the video screen to reproduce the image of document 14 on screen 4. The reproduced image is preferably located at an area such as that shown at 64 at the top of screen 4. Other locations may be found to be useful, and controls (not shown) are preferably provided to the user whereby the position of the electronic image can be changed.

Imaging device 62 reduces even further the required angular excursion for the operator's eyes and eliminates the necessity for separate viewing area 6.

Figure 6:
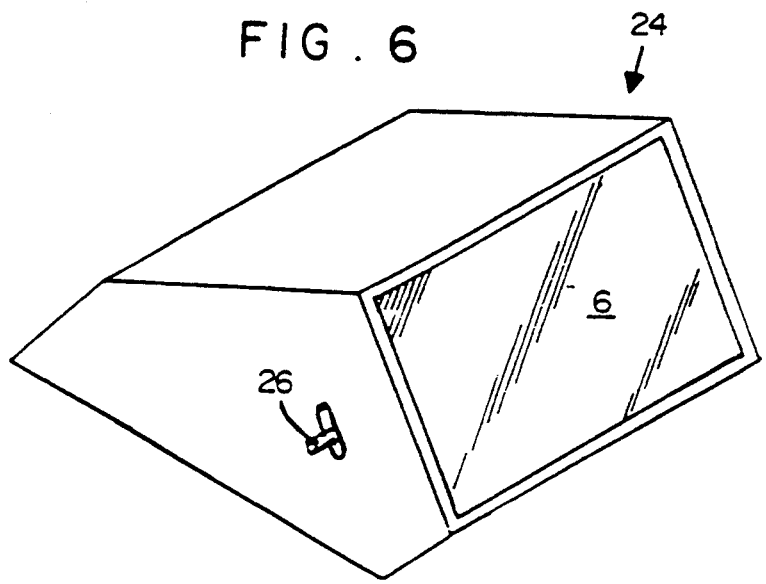
FIG. 6 is a perspective view of a removable cartridge for use in the apparatus shown in FIG. 1.

FIG. 6 shows a cartridge 24 which may be removably received in cabinet 2 and includes an operating lever 26 for controlling a projection lens system, such as that shown at 40 in FIG. 4, to focus an image of document 14 on the display area 6. Other possible embodiments of cartridge 24 would contain the elements described above with reference to the other viewing embodiments.

With reference to FIG. 1, keyboard 10 is mounted on racks 43 whereby it may be moved with respect to the cabinet 2 and consequently with respect to the screen 4. Accordingly, keyboard 10 may be placed at any desired location depending upon the individual operator's preference and the location of the document 14 or other work items. It will be appreciated that the setup described in FIGS. 1 through 6 greatly reduces the angular excursions required by the operator when performing work to comply with the physiological requirements discussed above to greatly increase the operator's comfort.

With reference to FIG. 1, area 8 may be adapted to contain a central processing unit and may include such devices as disk readers and/or internal memory devices. Area 8 is above and extends outwardly from the top of the video display screen 4 to a point vertically beyond the bottom of the screen to shield the screen from the room lights to reduce reflections from the face of display screen 4. In addition, side panels, such as that shown at 58 in FIG. 5, may be provided to extend along the sides of the display screen 4 to block light incident from the sides which would tend to create additional glare on screen 4.

The keyboard of the invention illustrated in FIGS. 7 to 11 may be used as a stand alone keyboard for any existing computer or may be used in a workstation in which the keyboard is partially or completely superimposed on the plane of the computer screen.

With reference to FIGS. 7 to 10, keyboard 102 includes a plurality of keys 104 arranged in the normal layout of a "QWERTY" typewriter keyboard. Keys 104 are located on keyboard halves 106 and 108 which are joined at central peak 110. Keyboard halves 106 and 108 slope downwardly away from each other on either side of central peak 110.

Figure 7:
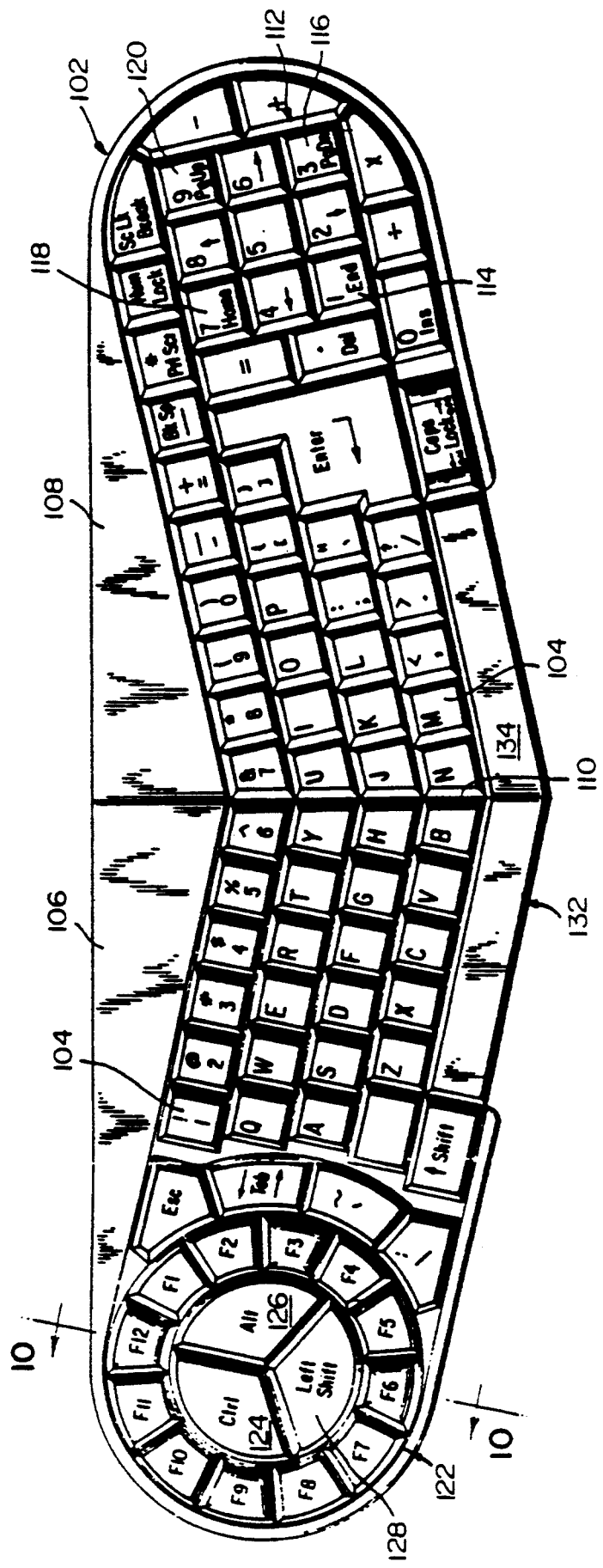
FIG. 7 is a top plan view of a preferred keyboard of the invention.

FIGS. 7 and 8 show keyboard 102 including calculator mnemonic 112 at its right end. The keys bearing numbers are arranged as known in the art, and in addition, key 114, bearing numeral 1, functions as the "END" key; key 116, bearing the numeral 3, functions as the "PAGE DOWN" key; key 118, bearing the numeral 7, functions as the "HOME" key; and key 120, bearing the numeral 9, additionally functions as the "PAGE UP" key. Further keys are arranged around the calculator mnemonic 112 so that they are easily reached by fingers of the right hand.

The left end of keyboard 102 contains a clock-face mnemonic 122. Clock-face mnemonic 122 includes the twelve function keys F1 through F12 arranged in a circle, as in a clock face. Thus, F1 is at the one o'clock position and F12 is at the twelve o'clock position, with the other function keys correspondingly arranged. The center of the clock face is divided into three segments. CONTROL key 124, ALTERNATE key 126 and SHIFT key 128 each occupy a respective 120° segment of the central portion of clock face mnemonic 122. Use of the function keys generally requires use of either the CONTROL, ALTERNATE or SHIFT key simultaneously or in quick succession with the function key being used. A user having acquired total tactile familiarity with the keyboard will readily be able to touch-type the combinations associated with use of the function keys. In contrast, known systems require the user to look at the keyboard when using the function keys, and significant time is lost in searching for the keys needed.

FIG. 10 is a cross-section through clock face mnemonic 122, showing domed upper surfaces 130 on functions keys F6, F9 and F12. Function key F3 also has a domed upper surface. Thus, keys at the three o'clock, six o'clock, nine o'clock and twelve o'clock positions have domed surfaces 130 to facilitate total tactile familiarity with the clock-face mnemonic. Placement of fingers on domed surfaces 130 immediately communicates to the user that the proper positions have been reached. In this way, a user may develop total tactile familiarity with the keyboard and may thus need only observe the screen and the copy without diverting his gaze to the keyboard.

Keyboard 102 also includes V-shaped space bar 132 which is located at the central forward edge of keyboard 102. Space bar 132 may be activated either by pressing vertically on upper surface 134, by pressing horizontally on front surface 136, or by pressing at a selected angle between the vertical and horizontal directions. In particular, pressure on front surface 136 allows the user to press space bar 132 with a natural "grasping" motion of the thumb toward the forefinger.

A further aid to gaining total tactile familiarity with keyboard 102 is the CAPS LOCK key 138. This key performs the function of a SHIFT key when pressed in its central portion 140. Outer portions 142 and 144 of key 138 are raised, as shown in FIG. 7, and the key is pivotally mounted to the keyboard base. Pressure on portion 142 activates the CAPS LOCK function, and pressure on portion 144 deactivates the CAPS LOCK. When the CAPS LOCK function is activated, a portion of that key, or the entire key, illuminates and remains so until the CAPS LOCK function is deactivated. Similarly, other keys, such as the NUM LOCK and SCROLL LOCK keys illuminate when those functions are activated.

A cursor control unit 146 (see FIG. 8) is located on the vertical front face of keyboard 102 below central peak 110. The linkage of the cursor control unit is, for example, similar to that of a track ball mouse or a joy stick. Cursor control unit 146 controls cursor movement according to a clock face system. Pressure on different parts of cursor control unit 146 moves the cursor in different directions. For example, pressure on the twelve o'clock position of cursor control unit 146 moves the cursor upwards, pressure on the three o'clock position moves the cursor to the right and pressure on the nine o'clock position moves the cursor to the left. Pressure on other positions of cursor control unit 146 moves the cursor in corresponding directions. The cursor control unit may be activated by either thumb pressing inward toward its respective forefinger, or both thumbs being used together to effect a fine movement control over the cursor. One thumb, thus, acts as a counterforce to the action of the other thumb.

Figure 12:
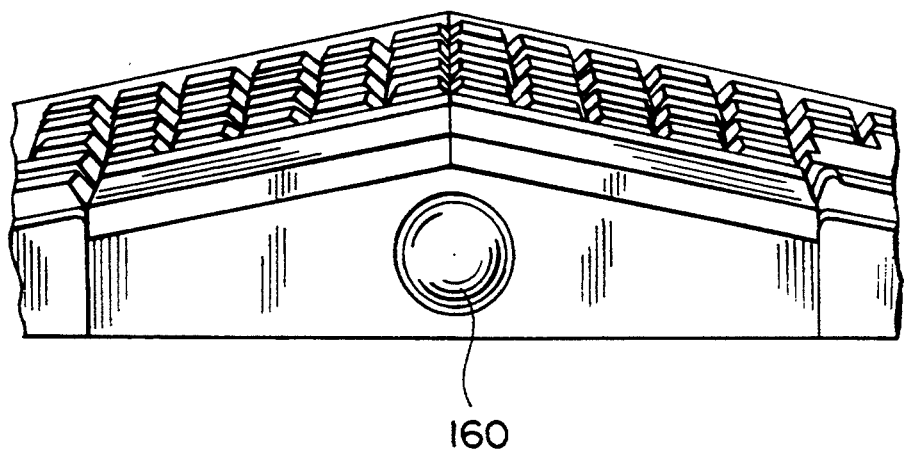
FIG. 12 is a partial front elevation view of a keyboard similar to the keyboard of FIG. 8 having a ball-shaped cursor control unit.
Figure 13:
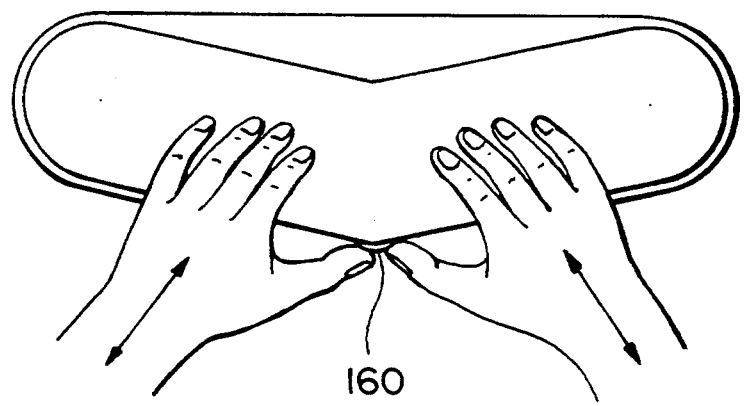
FIG. 13 is a schematic view showing use of a keyboard of FIG. 12 with the hands in prehensile position.

FIG. 12 shows a keyboard similar to that shown in FIG. 8 in which the cursor control unit 160 is substantially ball-shaped. Cursor control unit 160 has a convex surface which rotates around a universal joint (not shown) and pressure of both thumbs, either reinforcing or opposing each other may be used for moving the cursor. The hands of the user are in prehensile position, as shown in FIG. 13, when the ball-shaped cursor control unit is used.

Because of the center-peaked configuration the front of the keyboard provides an area where other keys or controls may be located to permit further advantageous use of the grasping motion of the thumb toward the forefinger. All of these actions are accomplished while the hands are in a prehensile position. This ensures greater tactile familiarity and is therefore less visually demanding.

Figure 11:
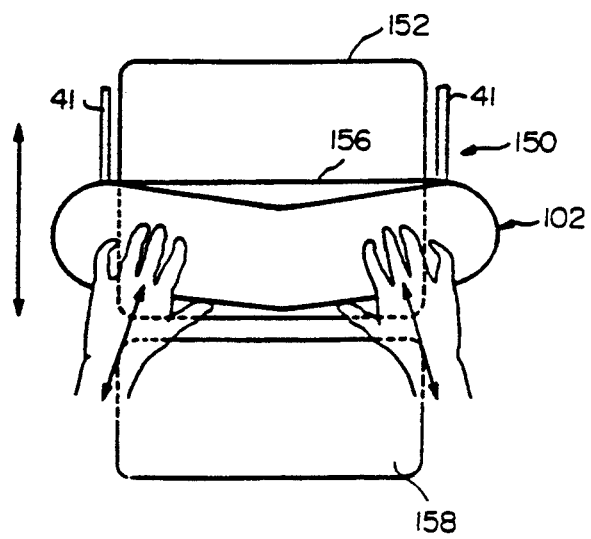
FIG. 11 is a schematic top plan view of a workstation of the invention using the keyboard shown in FIG. 7.

FIG. 11 schematically illustrates a particularly advantageous use of keyboard 102 when used with a workstation 150 as described above. Keyboard 102 is mounted for movement over screen 152 and moves up and down with respect to screen 150 on tracks 41 on either side of the screen.

The keyboard is provided with a straight upper surface which forms a cursor bar 156. As the keyboard is moved along the screen, the cursor bar 156 provides a visual guide to the line on which the cursor is moving on the screen. As the operator inputs text to the terminal, the keyboard may be moved down the screen with the cursor bar aligned with the line being typed. Should the operator need to change his gaze from the copy viewing area to the screen, the cursor bar immediately points out the line being typed, without confusion.

The arrangement shown in FIG. 11 requires minimal shifting of the operator's gaze from cursor line to keyboard or from the copy viewing area to keyboard. Preferably, there is a maximum shift of 15° between the copy viewing area and the screen and less than 15° from the cursor line at the top of the keyboard to the center of the keys. Viewing the copy viewing area, keyboard, and screen is thus facilitated with minimal shift in gaze. Even if the user does not have total tactile familiarity with the keyboard, efficiency is greatly increased due to the decreased eye strain achieved with the juxtaposition of the three areas.

Modifications within the scope of the appended claims will be apparent to those who are skilled in the art.

What is claimed is:

1. A keyboard for a computer for operating with hands of a user disposed in a prehensile position, said keyboard comprising:

a keyboard body, keyboard means located at an upper surface of said keyboard body and having keys for depressing by movement of fingers of a user in a first direction;

spacing means mounted at a forward edge of said keyboard means for operating by movement of a thumb of the user;

activating means mounted on said keyboard body on a surface transverse to said upper surface, located centrally with respect to a length of said keyboard means for movement in all directions to control all directions of movement of a cursor on a display screen of the computer by movement of at least one thumb of a user in a second direction transverse to said first direction for engagement of said keyboard means and said activating means by the user's hands disposed substantially in a prehensile alignment position with the thumb opposed to the fingers in a substantially grasping motion between the thumb and fingers of the user to cause actuation of said keyboard means and said activating means while the thumb and fingers are in close proximity in prehensile alignment when using the keyboard and whereby ulnar abducted deviation and hand-pronation are reduced.

2. A keyboard according to claim 1 further comprising:

circular means for locating twelve numbered function keys disposed toward a first outward end of said surface means; and keypad means for locating numeric keys disposed toward a second outward end of said surface means.

3. A keyboard according to claim 2 wherein said twelve numbered function keys are positioned circumferentially around said circular means in numerical positions corresponding to numbers on a clock.

4. A keyboard according to claim 3 further comprising alternate, control and shift function keys positioned in a central portion of said circular means.

5. A keyboard according to claim 4 wherein each of the centrally positioned keys substantially occupies a 120° segment of the central portion of said circular means.

6. A keyboard according to claim 3 wherein the function keys positioned at three-, six-, nine- and twelve-o'clock comprise domed upper surfaces.

7. A keyboard according to claim 6 wherein other numbered function keys comprise flat upper surfaces.

8. A keyboard according to claim 2 wherein said keyboard means comprises first slanting keyboard surface means comprising keys for depressing by fingers of the user's left hand and second slanting keyboard surface means comprising keys for depressing by fingers of the user's right hand, said first and second keyboard surface means joined at a peaked central edge forming a V-shape which slopes downwardly toward the user and laterally away from the user.

9. A keyboard according to claim 8 wherein said spacing means comprises means positioned on said first slanting keyboard surface means and on said second slanting keyboard surface means.

10. A keyboard according to claim 9 wherein said spacing means further responds to thumb pressure in said first direction.

11. A keyboard according to claim 9 wherein said spacing means further responds to thumb pressure at a selected angle.

12. A keyboard according to claim 8 further comprising key means for locking alphabet keys in upper case or lower case mode comprising a first raised portion, actuation of which causes said key means to stay in a locked position.

13. A keyboard according to claim 12 wherein said locking key means further comprises a second raised portion, depression of which releases said key means from said locked position.

14. A keyboard according to claim 13 wherein said locking means is located on the right hand side of the keyboard.

15. A keyboard according to claim 1 wherein said activating means comprises a plurality of areas responsive to thumb pressure whereby pressure on one of said areas moves the cursor in a selected direction.

16. A keyboard according to claim 1 wherein said activating means is positioned below said spacing means.

17. A keyboard for a computer, said keyboard comprising:

a keyboard body, first activating means located on at least one first upper surface of said keyboard body for actuation by movement of fingers of a user; and second activating means fixed and projecting from a second surface of said keyboard body, located centrally with respect to a length of said first activating means for movement in all directions to control all directions of movement of a cursor on a display screen of the computer by at least one thumb of the user, said second surface extending transverse to said at least one first surface for engagement of said first activating means and said second activating means by hands of a user positioned in a prehensile alignment so that a substantially grasping motion between the at least one thumb and fingers of the user can cause actuation of both said first activating means and said second activating means while said at least one thumb and fingers are in a close proximity in prehensile alignment.

18. A keyboard according to claim 17 wherein said second activating means is adapted for controlling by both thumbs of a user substantially simultaneously.

19. A keyboard for a computer, said keyboard comprising:

a keyboard body, first activating means located on first and second upper slanting keyboard surfaces of said keyboard body comprising keys for depressing by fingers of a user's left and right hands respectively, said first and second slanting keyboard surfaces joined at a peak central edge forming a V-shape which slopes downwardly toward the user and laterally away from the user; and second activating means on a third surface of said keyboard body, located centrally with respect to a length of said first activating means for movement in all directions to control all directions of movement of a cursor on a display screen of the computer by at least one thumb of the user, said third surface extending transverse to said first and second upper slanting keyboard surfaces for engagement of said first activating means and said second activating means by hands of a user disposed in a substantially prehensile alignment position with substantially straight wrist during use so that a substantially grasping motion between the at least one thumb and fingers of the user can cause actuation of said first activating means and said second activating means while said at least one thumb and fingers are in a close proximity in prehensile alignment.

20. A keyboard according to claim 19 wherein said second activating means comprises a ball-shaped surface for activating by the at least one thumb of the user.

21. A keyboard according to claim 20 further comprising circular means for locating twelve numbered function keys disposed toward an outward end of said first slanting keyboard surface, and keypad means for locating numeric keys disposed toward an outward end of said second slanting keyboard surface.

22. A keyboard for a computer for operating with hands of a user disposed in a prehensile position, said keyboard comprising:

a keyboard body, keyboard means located at an upper surface of said keyboard body comprising first and second transverse surfaces with a common edge located centrally with respect to a length of said keyboard means, said common edge located through the entire width of said keyboard means, and having keys for depressing by movement of fingers of a user in a first direction;

spacing means mounted at a forward edge of said keyboard means for operating by movement of a thumb of the user;

activating means mounted on said keyboard body on a third surface transverse to each of said first and second transverse surfaces, located centrally with respect to a length of said keyboard means for rotational movement of said activating means in all directions to control all directions of movement of a cursor on a display screen of the computer by movement of at least one thumb of a user in a second direction transverse to said first direction for engagement of said keyboard means and said activating means by the user's hands disposed substantially in a prehensile alignment position with the thumb opposed to the fingers in a substantially grasping motion between the thumb and fingers of the user to cause actuation of said keyboard means and said activating means while the thumb and fingers are in close proximity in prehensile alignment when using the keyboard and whereby ulnar abducted deviation and hand-pronation are reduced.

23. A keyboard for a computer, said keyboard comprising:

a keyboard body, first activating means located on at least one first upper surface of said keyboard body comprising first and second transverse surfaces with a common edge located centrally with respect to a length of said first activating means, said common edge located through the entire width of said first activating means, for actuation of said first activating means by movement of fingers of a user; and second activating means fixed and projecting from a third surface of said keyboard body, located centrally with respect to a length of said first activating means for rotational movement in all directions to control all directions of movement of a cursor on a display screen of the computer by at least one thumb of the user, said third surface extending transverse to said first and second transverse surfaces for engagement of said first activating means and said second activating means by hands of a user positioned in a prehensile alignment so that a substantially grasping motion between the at least one thumb and fingers of the user can cause actuation of both said first activating means and said second activating means while said at least one thumb and fingers are in a close proximity in prehensile alignment.

24. A keyboard for a computer, said keyboard comprising:

a keyboard body, first activating means located on first and second upper slanting keyboard surface of said keyboard body comprising keys for depressing by fingers of a user's left and right hands respectively, said first and second slanting keyboard surfaces joined at a peak central edge forming a V-shape which slopes downwardly toward the user and laterally away from the user, said peak central edge located through the entire width of said first activating means; and second activating means on a third surface of said keyboard body, located centrally with respect to a length of said first activating means for rotational movement in all directions to control all directions of movement of a cursor on a display screen of the computer by at least one thumb of the user, said third surface extending transverse to said first and second upper slanting keyboard surfaces for engagement of said first activating means and said second activating means by hands of a user disposed in a substantially prehensile alignment position with substantially straight wrist during use so that a substantially grasping motion between the at least one thumb and fingers and said second activating means while said at least one thumb and fingers are in a close proximity in prehensile alignment.

* * * * *